J. H. HAMMOND, Jr.
SYSTEM FOR CONTROL OF BODIES BY RADIANT ENERGY.
APPLICATION FILED JULY 14, 1913. RENEWED OCT. 9, 1915.

1,418,788.

Patented June 6, 1922.
2 SHEETS—SHEET 1.

Witnesses:
Carl L. Choate.
Franklin E. Low

Inventor:
John Hays Hammond Jr.,
by Emery, Booth, Janney and Varney
Attys.

J. H. HAMMOND, Jr.
SYSTEM FOR CONTROL OF BODIES BY RADIANT ENERGY.
APPLICATION FILED JULY 14, 1913. RENEWED OCT. 9, 1915.

1,418,788.

Patented June 6, 1922.
2 SHEETS—SHEET 2.

Witnesses:
Horace A. Crossman
Carl L. Choate

Inventor:
John Hays Hammond, Jr.
by Emery, Booth, Janney & Varney
Attys

UNITED STATES PATENT OFFICE.

JOHN HAYS HAMMOND, JR., OF GLOUCESTER, MASSACHUSETTS.

SYSTEM FOR CONTROL OF BODIES BY RADIANT ENERGY.

1,418,788.

Specification of Letters Patent.   Patented June 6, 1922.

Application filed July 14, 1913, Serial No. 778,828.   Renewed October 9, 1915.   Serial No. 55,114.

*To all whom it may concern:*

Be it known that I, JOHN HAYS HAMMOND, Jr., a citizen of the United States, and a resident of Gloucester, in the county of Essex and State of Massachusetts, have invented an Improvement in Systems for Control of Bodies by Radiant Energy (Case A), of which the following description, in connection with the accompanying drawings, is a specification, like characters on the drawings representing like parts.

This invention relates to the control of moving bodies at a distance by radiant energy.

In order that the principle of the invention may be readily understood, I have disclosed a single embodiment thereof in the accompanying drawing wherein.

In order to control moving bodies at a distance by radiant energy, such for example as vessels, it has heretofore been necessary that the operator shall, at all times, be in touch with and constantly exercising control of the mechanism on board the vessel or other moving body which he is guiding. In practice, and particularly in controlling the course of a torpedo or other moving vessel by radiant energy, I have found that prior to my invention there has been a constant need of sending signals in order to rectify the errors in the course of such vessels due to wave, wind, current, and other phenomena. An important object of my invention is to provide means for maintaining a definite, predetermined or fixed direction of movement of the body, to which I shall herein refer for purposes of description as a vessel, and which may be of the torpedo or other type, and from which the direction or control of the vessel may be relieved by the distant operator who may then, by proper wave emission from the control station, direct the course of the vessel. For the accomplishment of my purpose, I prefer to provide a controller, herein represented as, and preferably, a gyroscope, which will keep the vessel on a fixed, definite or predetermined course except at such times as the operator desires to change the course and thereupon modifies the action of the gyroscope upon the vessel, as by temporarily terminating the control of the gyroscope thereover. I thereby obviate the necessity of constant wave emission from the control station, as for the purpose of compensating for deviations from a straight course due to the phenomena previously referred to, or other causes, and therefore greatly minimize the possibility of the enemy determining the wave length used in the control of the torpedo or other vessel and thereupon interfering with the control thereof.

Referring to the drawing wherein I have shown a single embodiment of means for carrying out my invention, I have indicated the open, oscillatory receiving circuit at 1, this being connected to the winding 2 of a closed, oscillatory circuit of any suitable type and shown as having in a condenser 3 and a suitable detector 4 for electrical oscillations. At 5, I have indicated a sensitive relay or other contact making device. These parts may be of any suitable construction not herein necessary more fully to describe or to indicate.

At 6, I have indicated a suitable battery or other source of electric energy, and at 7 I have diagrammatically represented a magnet controlling an armature 8 constructed as a valve having a port 9 therein and adapted when attracted by the magnet, to open a port 10 in a suitable cylinder 11 wherein said armature valve is suitably mounted, whereby air or other suitable fluid under pressure is admitted through a passage 12 in commmunication with a suitable tank or other supply of said fluid under pressure. Said tank or reservoir is represented at 12′ in Fig. 4. When the armature valve is not attracted the port 10 is closed. The cylinder 11 is provided with a piston 13 having a plunger 14 normally pressed toward the left, viewing Fig. 1 by a spring 15 or other suitable means. The walls of the cylinder 11 are provided with exhaust ports 10' adapted to register with the port 9 when the magnet 7 is de-energized.

Figure 1:
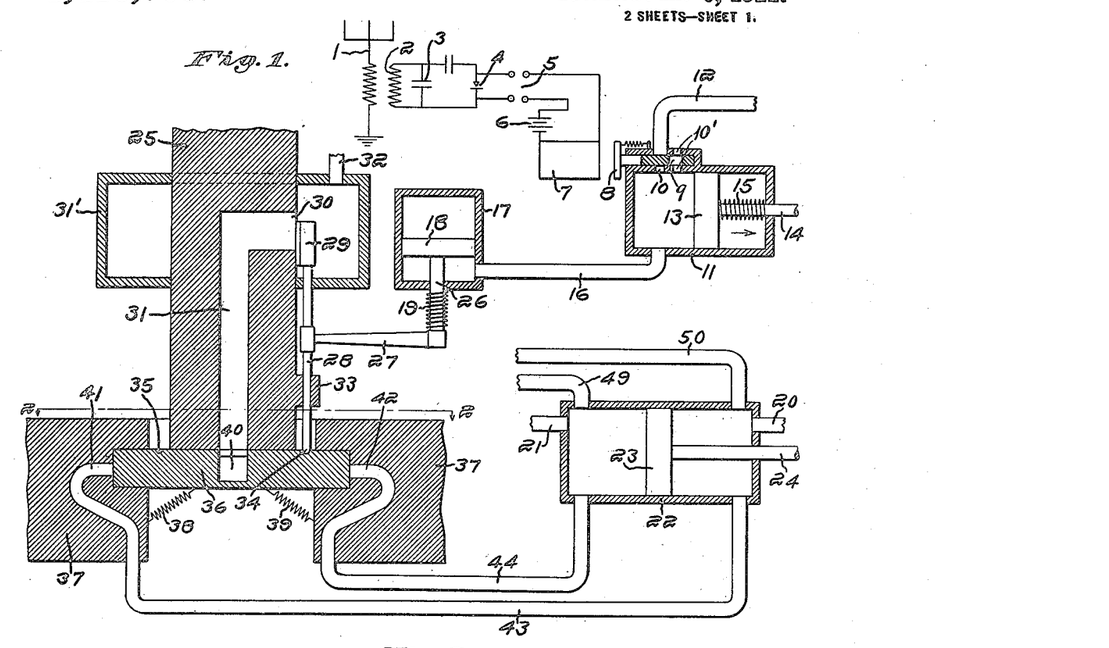
Fig. 1 is a view partially in vertical section upon the line 1—1 of Fig. 2, and partially diagrammatic, of one form of apparatus for practising my invention.
Figure 3:
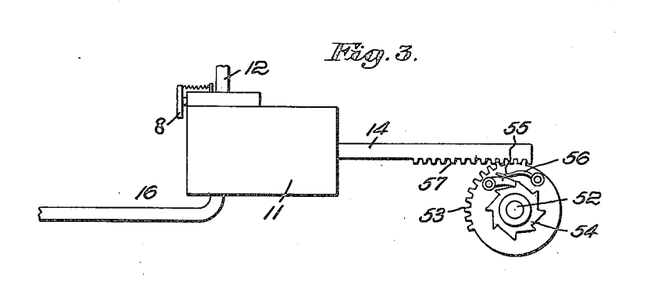
Fig. 3 is a detail representing the valve preferably employed by me and operating means therefor.

The cylinder 11 is in fluid communication by a passage 16 with a cylinder 17 having therein a piston 18 normally held against upward movement by a compression spring 19 suitably positioned or other suitable means. When air or other suitable fluid is admitted through the passage 12 into the cylinder 11 upon the receipt of an impulse by the oscillatory circuit 1, the piston 13 is moved against the stress of the spring 15 in the direction of the arrow and at the same time the air or other fluid under pressure is admitted into the cylinder 17 below the piston 18 thereby elevating the latter. The plunger 14 of the cylinder 11 preferably operates a suitable rotary pneumatic valve 14' represented in Figs. 3 and 4 and the ports of which are respectively in communication with the ports 20, 21 of a cylinder 22 having therein a piston 23 carried by a plunger 24, so that upon the movement of the piston 13, the said pneumatic valve will be controlled as hereinafter described to admit the compressed air or other fluid into the cylinder 22 at the proper side of the piston 23, the plunger 24 whereof is suitably connected to the rudder or other steering mechanism of the vessel and constitutes a portion of the rudder means.

I employ a suitable controller for the purpose of maintaining a definite, predetermined or fixed direction of movement of the vessel, and have found a gyroscope to be a most efficient device for the purpose. I have indicated at 25 an upright rod or shaft connected to or forming a part of the gyroscope (not otherwise shown), and maintained fixedly in space thereby.

I provide suitable means intermediate the shaft or rod 25 and the cylinder 17 for releasing the vessel from the control of the gyroscope. For that purpose I have herein represented the plunger 26 of the piston 18 as connected by a suitably mounted arm 27 to an upright plunger rod 28 having at its upper end a slide or other suitable valve 29 controlling a port 30 of a passage 31 in the shaft or rod 25. Surrounding the shaft or rod 25 is a suitable fluid receiving chamber 31' which is in communication by passage 32 with the supply tank for compressed air or other fluid, previously referred to.

Figure 2:
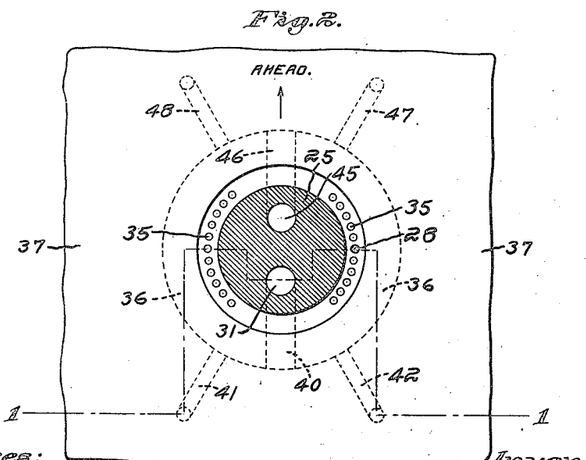
Fig. 2 is a transverse section upon the line 2—2 of Fig. 1.

The plunger rod 28 is suitably guided for vertical movement in a lug 33 of the shaft or rod 25 and in the wall of the chamber 31' and at its lower end is provided with a suitable rounded or other formation 34 adapted to fit into any one of a series of sockets or ratchet formations 35 in the upper face of a ring 36 which is mounted within the hull 37 of the vessel so as to move freely with respect thereto when not operatively connected to the gyroscope as described, excepting that it is provided with springs 38, 39 connecting it to the hull and by which its passage 40, indicated as substantially radial in Fig. 2 and in communication with the passage 31 of the rod or shaft 25, is normally held in a central position with respect to the passages 41 and 42 of the hull of the vessel. When the ring 36 is clutched or connected to the shaft or rod 25 of the gyroscope, the said ring and therefore its passage 40 remain fixed in space.

The said rod or plunger 25 is maintained fixed in space by the action of the gyroscope and so long as the plunger 28 is maintained in clutching engagement with the ring 36, the vessel is maintained on a fixed, definite or predetermined course (which is preferably a straight ahead course) inasmuch as if the vessel swings toward port while under the control of the gyroscope, the passage 41 of the vessel is brought into communication with the passage 40 of the ring 36 and the passage 31 of the gyroscopically controlled rod or shaft 25, thereby admitting fluid under pressure to the said passage 41 which is in communication by means of a suitable passage 43 with the cylinder 22. In this manner the rudder or other suitable guiding device of the vessel is moved sufficiently to restore the vessel to or to maintain it upon its predetermined course, or in other words to counteract any tendency of the vessel to deviate from its proper course. Similarly, if the vessel tends to turn to starboard, then the passage 42 of the hull is brought into register with the passage 40 of the ring 36 and into communication with the passage 31 of the gyroscopically controlled rod or shaft 25, whereby the air or other fluid under pressure is admitted through the passage 44 into the cylinder 22 at the other side of the piston 23 thereby to move the latter in the opposite direction, thus turning the rudder sufficiently to maintain the vessel upon its predetermined or fixed course.

I have represented the shaft or rod 25 as having an exhaust passage 45 in communication (when the ring 36 is clutched to the shaft or rod 25) with a passage 46 in the ring 36 and with which either of the exhaust passages 47, 48 of the hull may be brought into communication, it being evident that when the admission passage 41 of the hull is in communication with the passage 40 of the ring 36, the exhaust passage 47 of the hull is in communication with the passage 46 of the ring 36, and conversely, when the admission passage 42 of the hull is in communication with the passage 40, the exhaust passage 48 is in communication with the passage 46. I have represented the cylinder 22 as provided with exhaust passages 49, 50 in communication with the exhaust passages 47, 48 to provide exhaust in a manner well known in engine practice. One form of suitable connection for the purpose I have herein represented.

Figure 4:
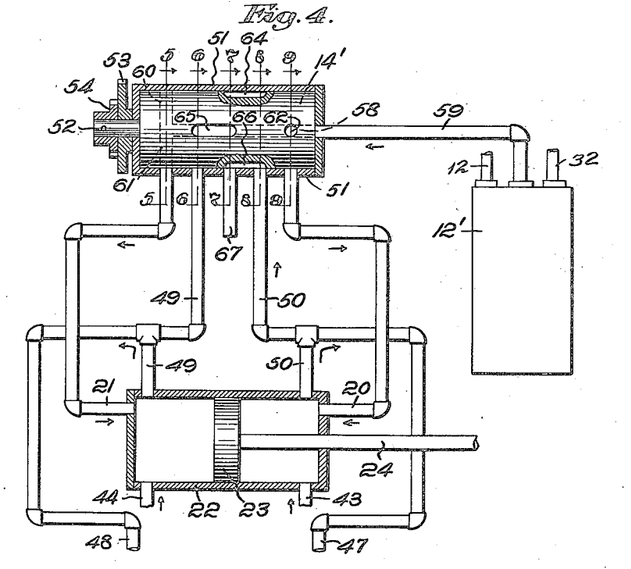
Fig. 4 is a view partially in vertical section and partially diagrammatic, showing a form of valve mechanism preferably employed in the practice of my invention, and the parts associated therewith.
Figures 5, 6, 7:
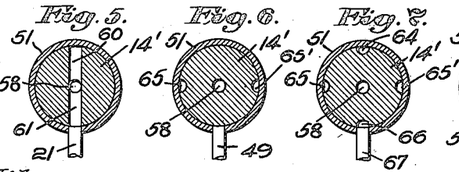
Figs. 5 to 9 are vertical sections upon the corresponding lines of Fig. 4.
Figure 8:
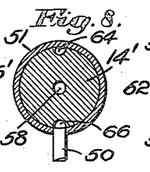
Figure 9:
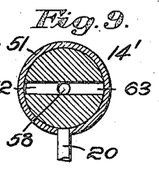

As shown most clearly in Fig. 4, the rotary valve 14' is mounted for rotation within a suitable casing 51. It has an end or spindle 52 protruding through said casing, and thereon is loosely mounted a gear 53. Fast upon said spindle is a ratchet 54, preferably having eight teeth, with which may suitably engage a pawl 55 pivoted upon the face of the gear 53 and held in position by spring 56. With the teeth of the gear 53 are adapted to mesh the teeth 57 formed upon the outer end of the plunger 14 shown in Fig. 1, whereby upon each energization of the magnet 7 said plunger 14 is moved to the right, viewing Figs. 1 and 3, thereby to impart an eighth rotation to said rotary valve 14'.

As shown in Figs. 4 to 9, the said valve 14' is provided with a passage 58 extending axially therealong and in communication with a pipe 59 leading from the main reservoir 12'. From the said axial passage 58 extend two substantially radially-aligned passages 60, 61, and two similar passages 62, 63, arranged at right angles to the passages 60, 61. The valve 14' is also provided with peripheral ports 64, 65, 65' and 66, which may be intermittently and in turn brought into register with the exhaust port 67.

As shown most clearly in Fig. 4, the passages 60, 61 are adapted periodically to be brought into communication with the supply passage 21, and similarly and alternately the passages 62, 63 are adapted to be brought into communication with the supply passage 20, whereby fluid under pressure may be admitted as required to opposite sides of the piston 23 when the vessel is steered from the distant control station. The exhaust passages 47, 48 in the hull of the vessel, and adapted periodically to be brought into communication with the exhaust passage 46 of the ring 36, are in communication with the exhaust pipes 49, 50 (shown also in Fig. 1) and the latter are also continued to the casing of the rotary valve 14', so that they may be alternately brought into communication with the exhaust port 67 by means of the ports 64, 65, 65' and 66.

When the vessel or other moving body is controlled by the gyroscope, fluid under pressure is admitted to the cylinder 22 by means of the pipe 43 or the pipe 44, and is exhausted through the pipe 49 or 50, the exhaust fluid passing in the direction of the arrows upon said pipes to the pipes 47 or 48, and thence through the exhaust 46. When, however, the gyroscope ceases to function and the vessel is being steered from the distant control station, fluid under pressure is admitted by means of the rotary valve through either the supply pipe 20 or the supply pipe 21, at one side or the other of the piston 23, and is exhausted through the pipe 49 or 50 and thence through the ports in the rotary valve to the exhaust 67, inasmuch as at such times the exhaust does not occur through the passage 46. Referring more in detail to the manner of operating the apparatus shown, so long as the vessel is being steered in one direction, as, for example, to the right, a continuous impulse is sent by holding down the key at the transmitting station. This results in the continuous energization of the magnet 7, so that the valve 8 is constantly held in its position to the left, thereby admitting air through pipe 12 and ports 9 and 10. This moves the piston 13 to the right, viewing Fig. 1, thereby turning the rotary valve through one step and so as to admit steering air to the proper end of the piston 22, as, for example, at the right hand end thereof. This lifts the piston 18 in the cylinder 17, and thereby disconnects the gyroscope. If now the vessel has been steered sufficiently in one direction and it is desired to let the gyroscope control, then the impulse is terminated, thus bringing the exhaust ports 10' in the wall of the cylinder 11 into register with the passage 9 in the valve 8. This permits the piston 13 to return to the left and by permitting air to escape through the pipe 16 tends to let the piston 18 down. The disk 36 is, however, not immediately clutched, inasmuch as the clutch operates slowly. Another impulse is immediately sent, thereby moving the piston 13 again to the right, and thus turning the rotary valve one step, that is, one eighth, revolution. This admits further air beneath the piston 18 and checks its downward movement. The rotary valve being now in the neutral position, the distant operator immediately ceases sending and, the valve 7 becoming deenergized, the valve 8 returns to the right and brings the port 9 therein into register with the ports 10', thus permitting air to escape from the cylinder 11 and also from beneath the piston 18 in the cylinder 17. This permits the gyroscope to be clutched in, so that it again functions. If, now, it is desired to steer the vessel in the opposite direction, then another prolonged impulse is sent, which turns the rotary valve one step and maintains the valve 8 open so long as steering in such direction, thereby unclutching the gyroscope and maintaining it unclutched so long as the steering in such last mentioned direction continues. If, now, it be desired again to permit the gyroscope to control, the former operation is repeated.

Any other suitable connections may be provided, that form of rotary valve herein represented being found suitable for the purpose.

In the manner described or in any other suitable manner, the vessel is, by the action of the gyroscope, maintained upon its predetermined, definite or fixed course without regard to disturbing phenomena, such for example as winds, waves and currents, and it is therefore unnecesary for the operator on shore, or at any other distant point, to constantly transmit signals for the purpose of rectifying such errors in the course of the vessel as would otherwise arise from the disturbing phenomena to which I have referred. Inasmuch as the operator need not constantly, or at frequent intervals, send impulses to maintain the vessel upon its fixed course, the possibility is largely minimized of the determination by the enemy of the wave length used in controlling the vessel.

When, however, the distant operator wishes to change the course of the vessel from that predetermined or fixed course upon which it is maintained by the gyroscopic control, he sends a suitable impulse, in the manner described, which will serve to energize the magnet 7 thus admitting air under pressure or other suitable fluid into the cylinder 11, thereby releasing the vessel from the gyroscopic control and admitting the compressed fluid by means of the described rotary pneumatic valve into the cylinder 22 at the proper side of the piston 23 so as to turn the rudder in the proper direction. It will be understood that the vessel or other body may be propelled in any suitable manner.

Having thus described one illustrative embodiment of my invention, I desire it to be understood that although specific terms are employed, they are used in a generic and descriptive sense and not for purposes of limitation, the scope of the invention being set forth in the following claims:

1. A system for controlling the operation of moving bodies at a distance by radiant energy including in combination, a body to be propelled, means carried thereby to maintain a predetermined or definite direction of bodily movement thereof, means upon said body controlled by radiant energy from a distant station to steer said body in directions independent of the relative position of said body and said control station and also of said predetermined direction of bodily movement, and co-acting means controlled from said distant station to determine or fix by radiant energy therefrom the control of said body by said direction-maintaining means.

2. A system for controlling the operation of moving bodies at a distance by radiant energy of characteristic periodicity, including in combination a body to be propelled, provided with means to maintain a predetermined or definite direction of bodily movement thereof, steering means independent of said direction maintaining means, and means to terminate by radiant energy of characteristic periodicity from a distance the control of said body by said direction maintaining means.

3. A system for controlling the operation of moving bodies at a distance including in combination, a vessel to be propelled, means carried thereby to maintain a predetermined or definite direction of bodily movement thereof, means upon said body controlled from a distant station to steer said body in directions independent of the relative positions of said body and said distant control station and also of said predetermined direction of bodily movement, and co-acting means controlled from said distant station to determine or fix therefrom the control of said body by said direction-maintaining means.

4. A system for controlling the operation of vessels at a distance by radiant energy, including in combination a vessel to be propelled having a gyroscope to impart thereto a predetermined or definite direction of movement controlled means for transmitting radiant energy from a distance, and means responsive to such radiant energy from a distance to release the vessel from the action of said gyroscope.

5. A system for controlling the operation of vessels at a distance by radiant energy, including in combination a vessel to be propelled having a gyroscope to impart thereto a predetermined or definite direction of movement, controlled means for transmitting radiant energy from a distance, and means responsive to such radiant energy from a distance to release the vessel from the action of said gyroscope and to direct the bodily movement thereof.

6. A system for controlling the operation of moving bodies at a distance by radiant energy including in combination, a body to be propelled, a controller thereon to maintain a predetermined or definite direction of bodily movement thereof, means upon said body controlled by radiant energy from a distant station to steer said body in directions independent of the relative positions of said body and said distant control station, and also of said controller, and co-acting means controlled from said distant station to determine or fix by radiant energy therefrom the control of said body by said controller.

7. A system for controlling the operation of moving bodies at a distance by radiant energy including in combination, a body to be propelled, a gyroscope carried thereby to maintain a predetermined or definite direction of bodily movement thereof, means upon said body controlled by radiant energy from a distant station to steer said body in directions independent of the relative positions of said body and said distant control station and also said predetermined direction of bodily movement, and means controlled from said distant station to vary the direction of movement of the body from that imposed thereon by said gyroscope.

8. A system for controlling the operation of moving bodies at a distance by radiant energy including in combination, a body to be propelled, rudder means therefor, a gyroscope upon said body to maintain a predetermined or definite direction of bodily movement thereof, means upon said body controlled by radiant energy from a distant station to steer said body in directions independent of the relative positions of said body and said distant control station and also of said predetermined direction of bodily movement, and co-acting means controlled from said distant station to vary the control of said body by said direction-maintaining means and to steer said body through said rudder means.

9. A system for controlling the operation of moving bodies at a distance by radiant energy including in combination, a body to be propelled, rudder means therefor, fluid pressure means governing said rudder means, means carried by said body to maintain a predetermined or definite direction of bodily movement thereof, means upon said body and controlled by radiant energy from a distant station to steer said body through said fluid pressure means in directions independent of the relative positions of said body and said distant control station and also of said predetermined direction of bodily movement, and co-acting means controlled from said distant station to determine or fix by radiant energy therefrom the control of said body by said direction-maintaining means.

10. A system for controlling the operation of moving bodies at a distance by radiant energy of characteristic periodicity, including in combination a body to be propelled, provided with means to maintain a predetermined or definte direction of bodily movement thereof, steering means independent of said direction maintaining means, and means controlled by raidant energy of characteristic periodicity to effect the steering of said body by said steering means and to release the body from the control of said direction maintaining means.

11. A system for controlling the operation of moving bodies at a distance by radiant energy including in combination, a body to be propelled, rudder means therefor, fluid pressure means governing said rudder means, a gyroscope carried by said body to maintain a predetermined or definite direction of bodily movement thereof, means upon said body and controlled by radiant energy from a distant station to steer said body through said fluid pressure means in directions independent of the relative positions of said body and said distant control station and also of said predetermined direction of bodily movement, and co-acting means controlled from said distant station to determine or fix by radiant energy therefrom the control of said body by said gyroscope.

12. A system for controlling the operation of moving bodies from a distance by radiant energy including in combination, a body to be propelled, means carried thereby to maintain a predetermined or definite direction of bodily movement thereof, means upon said body controlled by radiant energy from a distant control station to steer said body in directions independent of the relative positions of said body and said distant control station and also of said predetermined direction of bodily movement, and co-acting means controlled from said distant station to interrupt by radiant energy therefrom the control of said body by said direction-maintaining means.

13. A system for controlling the operation of moving bodies from a distance by radiant energy including in combination, a body to be propelled, means carried thereby to maintain a predetermined or definite direction of bodily movement thereof, means upon said body controlled by radiant energy from a distant control station to steer said body in directions independent of the relative positions of said body and said distant control station and also of said predetermined direction of bodily movement, and co-acting means controlled from said distant station to terminate by radiant energy therefrom the control of said body by said direction-maintaining means.

14. A system for controlling the operation of moving bodies at a distance by radiant energy, including in combination a vessel having a gyroscope to impart thereto a predetermined or definite direction of movement, rudder means, fluid pressure means operable upon said rudder means and controlled in its operation thereon by said gyroscope and means responsive to radiant energy from a distance to disconnect said vessel and gyroscope and to control said rudder means through said fluid pressure means.

15. A system for controlling the operation of moving bodies at a distance by radiant energy, including in combination a vessel having a gyroscope to maintain a predetermined or definite direction of bodily movement thereof, a rotary member maintained fixed in space by said gyroscope, rudder means, fluid pressure means operable on said rudder means, the vessel and said rotary member having passages for the fluid under pressure, and means responsive to radiant energy from a distance to interrupt the flow of fluid through said passages.

16. A system for controlling the operation of moving bodies at a distance by radiant energy, including in combination a vessel having a gyroscope to maintain a predetermined or definite direction of bodily movement thereof, rudder means, fluid pressure means operable upon said rudder means, means to clutch said gyroscope and said vessel and to control said fluid pressure means, and means responsive to radiant energy from a distance to unclutch said vessel and gyroscope.

17. A system for controlling the operation of moving bodies at a distance by radiant energy, including in combination a vessel having a gyroscope to maintain a predetermined or definite direction of bodily movement thereof, rudder means, fluid pressure means operable upon said rudder means and controlled in its operation thereon by said gyroscope controlled means for transmitting radiant energy from a distance, and a single acting means, responsive to such radiant energy from a distance, to terminate the control of the vessel by said gyroscope, and upon such termination, to act upon said rudder means.

18. A system for controlling the operation of moving bodies at a distance by radiant energy, including in combination a vessel having a gyroscope to maintain a predetermined or definite direction of bodily movement thereof, rudder means, fluid pressure means operable upon said rudder means and controlled in its operation thereon by said gyroscope controlled means for transmitting radiant energy from a distance, and a single acting means, responsive to such radiant energy from a distance, to terminate the control of the vessel by said gyroscope, and upon such termination, to act upon said rudder means through said fluid pressure means.

19. A system for controlling the operation of vessels from a distance by radiant energy including in combination, a vessel to be propelled, a controller carried thereby to maintain a predetermined or definite direction of bodily movement thereof, means upon said vessel controlled by radiant energy from a distant control station to steer said vessel in directions independent of the relative positions of said vessel and said distant control station and also of said predetermined direction of bodily movement, and coacting means controlled from said distant station to interrupt by radiant energy therefrom the control of said vessel by said direction-maintaining means.

20. A system for controlling the operation of moving bodies at a distance by radiant energy of characteristic periodicity including in combination, a body to be propelled provided with means to maintain a predetermined or definite direction of bodily movement thereof, steering means independent of said direction-maintaining means, and means to fix or determine by radiant energy of characteristic periodicity from a distance the control of said body by said direction-maintaining means.

21. A system for controlling the operation of moving bodies at a distance by radiant energy of characteristic periodicity including in combination, a body to be propelled provided with means to maintain a predetermined or definite direction of bodily movement thereof, steering means independent of said direction maintaining means, and means responsive to radiant energy of characteristic periodicity from a distance, to release said body from the control of said direction maintaining means.

22. A system for controlling the operation of moving bodies at a distance by radiant energy of characteristic periodicity including in combination a body to be propelled, provided with means to maintain a predetermined or definite direction of bodily movement thereof, a rudder device, and means responsive to such radiant energy to control the action of said rudder device irrespective of said direction maintaining means.

23. A system for controlling the operation of moving bodies at a distance by radiant energy of characteristic periodicity including in combination a body to be propelled, provided with means to maintain a predetermined or definite direction of bodily movement thereof, a rudder device, and means responsive to such radiant energy to control the action of said rudder device independently of said direction maintaining means.

24. A system for controlling the operation of moving bodies at a distance by radiant energy including in combination controlled means for transmitting radiant energy, a body to be propelled provided with means to maintain a predetermined or definite direction of bodily movement thereof, a rudder device, and means responsive to such radiant energy to control the action of said rudder device independently of said direction maintaining means.

25. A system for controlling the operation of moving bodies at a distance by radiant energy including in combination controlled means for transmitting radiant energy, a body to be propelled provided with means to maintain a predetermined or definite direction of bodily movement thereof, and means to terminate by radiant energy from said controlled means the control of said body by said direction maintaining means.

26. A system for controlling the operation of moving bodies at a distance by radiant energy including in combination controlled means for transmitting radiant energy, a body to be propelled provided with means to maintain a predetermined or definite direction of bodily movement thereof, a rudder device, and means responsive to such radiant energy to control the action of said rudder device independently of said direction-maintaining means and to turn said body in directions having no fixed relation and independent of that established by said predetermined direction-maintaining means.

27. A system for the control of moving bodies including in combination, a body to be propelled, steering means thereon, means active upon said steering means to maintain a predetermined or definite direction of bodily movement of said body and means under predetermined external control independent of the terminus of the body's travel to effect or modify the action of said direction maintaining means thereby to direct the body upon any predetermined course.

28. A system for the control of moving bodies including in combination, a body to be propelled, steering means thereon, a gyroscope active upon said steering means to maintain a predetermined or definite direction of bodily movement of said body, and means under predetermined external control independent of the terminus of the body's travel to effect or modify the action of said gyroscope thereby to direct the body upon any predetermined course.

29. A system for the control of moving bodies including in combination, a body to be propelled, steering means thereon, means active upon said steering means to maintain a predetermined or definite direction of bodily movement of said body and means under predetermined external control independent of the terminus of the body's travel to effect or modify the action of said direction maintaining means thereby to direct the body upon either of two divergent courses or upon courses intermediate thereof.

30. A system for the control of moving bodies including in combination, a body to be propelled, steering means thereon, means active upon said steering means to mantain a predetermined or definite direction of bodily movement of said body and means under predetermined external control independent of the terminus of the body's travel to effect or modify the action of said direction maintaining means thereby to direct the body upon any selected course throughout an unlimited arc.

31. A system for the control of moving bodies including in combination, a body to be propelled, steering means thereon, means active upon said steering means to maintain a predetermined or definite direction of bodily movement of said body and means under predetermined external control independent of the terminus of the body's travel to effect or modify the action of said direction maintaining means thereby to direct the body upon any selected course.

32. A system for the control of moving bodies including in combination, a body to be propelled, steering means thereon, means active upon said steering means to maintain a predetermined or definite direction of bodily movement of said body and means under predetermined external control independent of the terminus of the body's travel to effect or modify the action of said direction maintaining means thereby to direct the body upon any selected course of a plurality of courses.

33. A system for the control of moving bodies including in combination, a body to be propelled, steering means thereon, means active upon said steering means to maintain a predetermined or definite direction of bodily movement of said body and means under predetermined external control independent of the terminus of the body's travel to effect or modify the action of said direction maintaining means thereby to direct the body either to starboard or to port.

34. A system for the control of moving bodies including in combination, a body to be propelled, steering means thereon, means active upon said steering means to maintain a predetermined or definite direction of bodily movement of said body and means independently of the target to effect or modify the action of said direction maintaining means thereby to direct the body upon a fixed selected course toward said target.

35. A system for the control of moving bodies including in combination, a body to be propelled, steering means thereon, means active upon said steering means to maintain a predetermined or definite direction of bodily movement of said body and means independent of the target to effect or modify the action of the direction maintaining means to set the body upon a course determined by the position of the said target.

36. A system for the control of moving bodies including in combination, a body to be propelled, steering means thereon, means active upon said steering means to maintain a predetermined or definite direction of bodily movement of said body and means independent of the target to effect or modify the action of the direction maintaining means to set the body upon a course to starboard or to port determined by the position of the said target.

37. A system for the control of moving bodies including in combination, a body to be propelled, steering means thereon, means active upon said steering means to maintain a predetermined or definite direction of bodily movement of said body and means under predetermined external control independent of the terminus of the body's travel to effect or modify the action of the direction maintaining means to set the body upon a course through any desired angle.

38. A system for the control of moving bodies including in combination, a body to be propelled, steering means thereon, means active upon said steering means to maintain a predetermined or definite direction of bodily movement of said body and means under the control of the sender of the moving body to effect or modify the action of the direction maintaining means to set the body upon a course at any desired angle with respect to said predetermined or definite direction of bodily movement.

39. A system for the control of moving bodies including in combination, a body to be propelled, steering means thereon, means active upon said steering means to maintain a predetermined or definite direction of bodily movement of said body and means independent of the target to effect or modify the action of the direction maintaining means to set the body upon a course at any desired angle with respect to said predetermined or definite direction of bodily movement dependent upon the position of the said target.

40. A system for the control of moving bodies including in combination, a body to be propelled, steering means thereon, means active upon said steering means to maintain a predetermined or definite direction of bodily movement of said body and means under the control of the sender of the moving body to effect or modify the action of the direction maintaining means to set the body upon a course having any desired degree of divergence with respect to said predetermined or definite direction of bodily movement.

41. A system for the control of moving bodies including in combination, a body to be propelled, steering means thereon, means active upon said steering means to maintain a predetermined or definite direction of bodily movement of said body and means under the control of the sender of the moving body to effect or modify the action of the direction maintaining means to set the body upon a course at a variable angle with respect to said predetermined or definite direction of bodily movement.

42. A system for the control of moving bodies including in combination, a body to be propelled, steering means thereon, means active upon said steering means to maintain a predetermined or definite direction of bodily movement of said body and means independent of the target to effect or modify the action of the direction maintaining means to set the body upon a course at a variable angle with respect to said predetermined or definite direction of bodily movement dependent upon the position of the said target.

43. A system for the control of moving bodies including in combination, a body to be propelled, steering means thereon, means active upon said steering means to maintain a predetermined or definite direction of bodily movement of said body and modifying means under predetermined external control independent of the terminus of the body's travel to effect the travel of said body upon a course at any desired angle with respect to said predetermined or definite direction of bodily movement.

44. A system for the control of moving bodies including in combination, a body to be propelled, steering means thereon, means active upon said steering means to maintain a predetermined or definite direction of bodily movement of said body, and associated means under predetermined control independent of the terminus of the body's travel whereby to effect the travel of said body upon a course at any desired angle with respect to said predetermined or definite direction of bodily movement.

45. A system for the control of moving bodies including in combination, a body to be propelled, steering means thereon, and means including a gyroscope and also including controlling means independent of the terminus of the body's travel to effect the travel of said body upon a course at any desired angle with respect to the predetermined or definite direction of bodily movement normally established by said gyroscope.

46. A system for the control of moving bodies including in combination, a body to be propelled, steering means thereon, and means including a gyroscope and associated co-acting means independent of the terminus of the body's travel whereby to effect the travel of said body upon a course at any desired angle with respect to the course normally established by said gyroscope.

47. A system for the control of moving bodies including in combination, a body to be propelled, steering means thereon, means to maintain a predetermined or definite direction of bodily movement of said body, and means independent of the object to be attacked to effect or modify the action of said direction-maintaining means, thereby to direct the body upon a predetermined course irrespective of sound emanations from the object to be attacked.

48. A system for the control of moving bodies including in combination, a body to be propelled, steering means thereon, means active upon said steering means to maintain a predetermined or definite direction of bodily movement of said body, and means responsive to electrical emanations and independent of the object to be attacked to effect or modify the action of said direction-maintaining means, thereby to direct the body upon a predetermined course regardless of sound emanations from the object to be attacked.

49. A system for the control of moving bodies including in combination, a body to be propelled, steering means thereon, means active upon said steering means to maintain a predetermined or definite direction of bodily movement of said body, and means to effect modification of the action of said direction-maintaining means, and whereby the body may be caused to travel upon a straight course as distinguished from said predetermined or definite direction of bodily movement.

50. A system for the control of moving bodies including in combination, a body to be propelled, steering means therefor, means to maintain a predetermined or definite direction of bodily movement of the body, and means independent of the object to be attacked to modify the action of said direction maintaining means, and whereby the body may be caused to travel upon a continuous straight path as contradistinguished from the path determined by said predetermined or definite direction of bodily movement.

51. The combination with a movable body, of means to stabilize said body with respect to a given axis, and means responsive to radiant energy, to modify the control of said body by said stabilizing means and to rotate said body selectively in either direction about said axis.

52. The combination with a movable body, of means automatically operative to stabilize said body with respect to a given axis, and fluid actuated means responsive to radiant energy to modify the control of said body by said stabilizing means and to rotate said body selectively in either direction about said axis.

53. The combination with a movable body, of means including a gyroscope automatically operative to stabilize said body with respect to a given axis, and means responsive to radiant energy to modify the control of said body by said stabilizing means and to rotate said body selectively in either direction about said axis.

54. The combination with a movable body, of means automatically operative to stabilize said body with respect to a given axis, and means to modify the automatic operation of said stabilizing means and to rotate said body selectively in either direction about said axis.

55. The combination with a movable body, of means automatically operative to stabilize said body with respect to a given axis, and means to vary the automatic operation of said stabilizing means and to rotate said body selectively in either direction about said axis.

56. The combination with a movable body, of means automatically operative to stabilize said body with respect to a given axis, and means to modify the automatic action of said stabilizing means and to rotate said body selectively through any desired angle about said axis.

57. The combination with a movable body, of means automatically operative to stabilize said body with respect to a given axis, and means responsive to radiant energy to modify the automatic action of said stabilizing means and to rotate said body selectively through any desired angle about said axis.

58. The combination with a movable body, of means automatically operative to stabilize said body with respect to a given axis and means responsive to radiant energy to modify the automatic action of said stabilizing means and to rotate said body selectively to any desired extent in either direction about said axis.

59. The combination with a movable body, of means automatically operative to stabilize said body with respect to a given axis and means responsive to radiant energy to overcome the automatic action of said stabilizing means and to rotate said body selectively to any desired extent in either direction about said axis.

60. The combination with a dirigible body, of means automatically operative to steer said body substantially in a predetermined direction, and means responsive to radiant energy to modify the automatic action of said first mentioned means and to steer said body selectively either in one direction or in another direction away from said first mentioned direction.

61. The combination with a movable body, of means automatically operative to stabilize said body with respect to a given axis, said means including two elements separately rotatable about a common axis relative to said body, one of said elements being normally held substantially against rotation in space about said common axis and the other of said elements being normally held against rotation about said common axis with respect to said body, and means responsive to radiant energy to rotate said last mentioned element about said common axis with respect to the other of said elements.

62. A system for controlling the operation of moving bodies at a distance by radiant energy including, in combination, a body to be propelled, steering means thereon, fluid pressure means, means active upon said fluid pressure means to maintain a predetermined or definite direction of bodily movement of said body, and means to effect the steering of said body selectively through any part of an unlimited angle.

63. A system for controlling the operation of moving bodies at a distance by radiant energy including, in combination, a body to be propelled, steering means thereon, means to maintain a predetermined or definite direction of bodily movement of said body, and electrically controlled means to effect the steering of said body selectively through any part of an unlimited arc.

64. A system for controlling the operation of moving bodies at a distance by radiant energy including in combination, a body to be propelled, steering means thereon, fluid pressure means, means active upon said fluid pressure means to maintain a predetermined or definite direction of bodily movement of said body, and means responsive to radiant energy to effect the steering of said body selectively through any part of an unlimited arc.

65. A system for controlling the operation of moving bodies at a distance by radiant energy including in combination, a body to be propelled, steering means thereon, fluid pressure means, means active upon said fluid pressure means to maintain a predetermined or definite direction of bodily movement of said body, and means responsive to electrical manifestations of radiant energy to effect steering of said body selectively through any part of an unlimited arc.

66. A system for controlling the operation of moving bodies at a distance by radiant energy including in combination, a body to be propelled, steering means thereon, fluid pressure means, means active upon said fluid pressure means to maintain a predetermined or definite direction of bodily movement of said body, and means to render inactive said direction maintaining means and to effect the steering of said body selectively through any part of an unlimited arc.

67. A system for controlling the operation of moving bodies at a distance by radiant energy including in combination, a body to be propelled, steering means thereon, means to maintain a predetermined or definite direction of bodily movement of said body, and electrically controlled means to render inactive said means to maintain a predetermined or definite direction of bodily movement and to effect the steering of said body selectively through any part of an unlimited arc.

In testimony whereof, I have signed my name to this specification, in the presence of two subscribing witnesses.

JOHN HAYS HAMMOND, JR.

Witnesses:
JOHN D. CUNNINGHAM,
L. BELLE TAU.